US012567049B2

(12) United States Patent
Moshe et al.

(10) Patent No.: US 12,567,049 B2
(45) Date of Patent: *Mar. 3, 2026

(54) RADAR BASED SENSING FOR RETAIL APPLICATIONS

(71) Applicant: VAYYAR IMAGING LTD., Yehud (IL)

(72) Inventors: Shay Moshe, Petah Tikva (IL); Albert Jacob, Modiin Makabim Reut (IL); Michael Mendelovich, Tel Aviv-Jaffa (IL)

(73) Assignee: VAYYAR IMAGING LTD., Yehud (IL)

( * ) Notice: Subject to any disclaimer, the term of this patent is extended or adjusted under 35 U.S.C. 154(b) by 406 days.

This patent is subject to a terminal disclaimer.

(21) Appl. No.: 18/147,155

(22) Filed: Dec. 28, 2022

(65) Prior Publication Data

US 2023/0132993 A1 May 4, 2023

Related U.S. Application Data

(63) Continuation of application No. 16/863,129, filed on Apr. 30, 2020, now Pat. No. 11,544,691.

(60) Provisional application No. 62/840,817, filed on Apr. 30, 2019.

(51) Int. Cl.
| | |
|---|---|
| *G06Q 20/20* | (2012.01) |
| *G01S 7/03* | (2006.01) |
| *G01S 13/89* | (2006.01) |

(52) U.S. Cl.
CPC .............. *G06Q 20/203* (2013.01); *G01S 7/03* (2013.01); *G01S 13/89* (2013.01); *G06Q 20/208* (2013.01)

(58) Field of Classification Search
CPC ...... G06Q 20/203; G06Q 20/208; G01S 7/03; G01S 13/89; G01S 7/027; G01S 13/56; G01S 13/726; G01S 13/88
See application file for complete search history.

(56) References Cited

U.S. PATENT DOCUMENTS

| | | | |
|---|---|---|---|
| 7,844,081 | B2 | 11/2010 | McMakin et al. |
| 8,248,298 | B2 | 8/2012 | Lalezari |
| 8,779,965 | B2 | 7/2014 | Sentelle et al. |
| 10,521,646 | B2 | 12/2019 | Adato et al. |
| 2014/0278742 | A1 | 9/2014 | Macmillan et al. |

OTHER PUBLICATIONS

Daniel Avrahami, Below the Surface: Unobtrusive Activity Recognition for Work Surfaces using RF-radar sensing, Mar. 7-11, 2018 , IUI 2018 Session 5A: IUIs for Wearable, Mobile and Ubiquitous Computing, pp. 439-451 (Year: 2018).*

* cited by examiner

*Primary Examiner* — Aaron N Tutor

(74) *Attorney, Agent, or Firm* — FisherBroyles, LLP; Roger L. Browdy; Ronni S. Jillions

(57) ABSTRACT

A radar system for monitoring shelves in a retail environment, where the system monitors the occupancy of the shelves and/or the dynamics of the customers in front of the shelves. The radar is preferably a wideband 3D imaging MIMO radar.

18 Claims, 13 Drawing Sheets

470

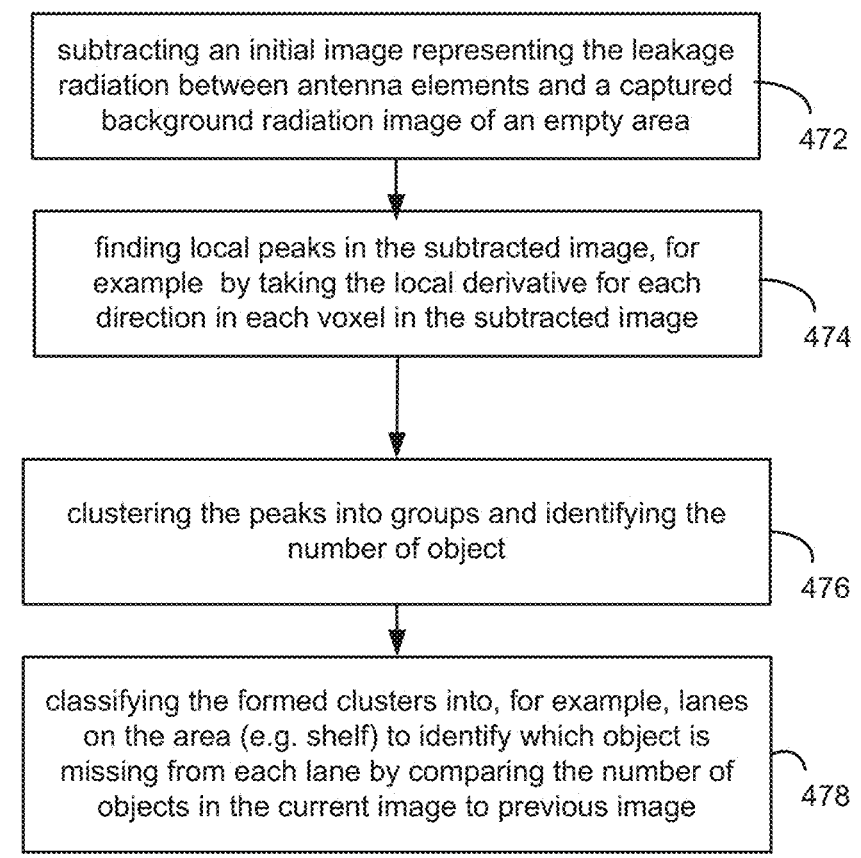

subtracting an initial image representing the leakage radiation between antenna elements and a captured background radiation image of an empty area

472 finding local peaks in the subtracted image, for example by taking the local derivative for each direction in each voxel in the subtracted image

474 clustering the peaks into groups and identifying the number of object

476 classifying the formed clusters into, for example, lanes on the area (e.g. shelf) to identify which object is missing from each lane by comparing the number of objects in the current image to previous image

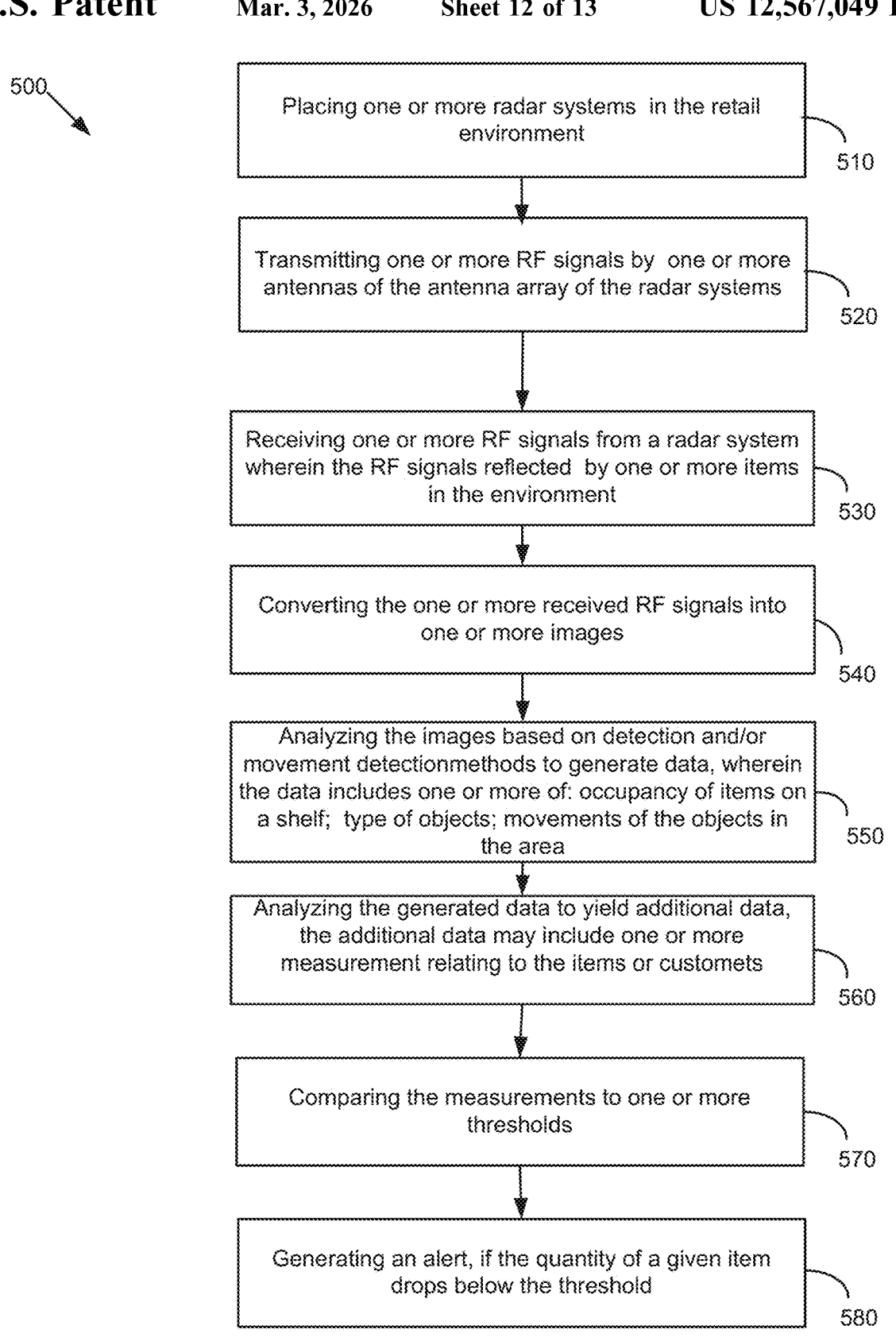

500

Placing one or more radar systems in the retail environment
510

Transmitting one or more RF signals by one or more antennas of the antenna array of the radar systems
520

Receiving one or more RF signals from a radar system wherein the RF signals reflected by one or more items in the environment
530

Converting the one or more received RF signals into one or more images
540

Analyzing the images based on detection and/or movement detectionmethods to generate data, wherein the data includes one or more of: occupancy of items on a shelf; type of objects; movements of the objects in the area
550

Analyzing the generated data to yield additional data, the additional data may include one or more measurement relating to the items or customets
560

Comparing the measurements to one or more thresholds
570

Generating an alert, if the quantity of a given item drops below the threshold
580

RADAR BASED SENSING FOR RETAIL APPLICATIONS

CROSS-REFERENCE

The present application claims priority to U.S. Provisional Application Ser. No. 62/840,417 filed on Apr. 30, 2019, entitled "RADAR BASED SENSING FOR RETAIL APPLICATIONS" which is incorporated herein by reference in its entirety.

TECHNICAL FIELD

The present invention relates to the use of radars for applications and systems, and, more specifically, but not exclusively, to an assessment of shelf occupancy and of customers' behavioral assessment, for example in a retail environment, using radar systems and methods.

BACKGROUND OF THE INVENTION

Retail industry is constantly optimizing its processes by utilizing logistic and behavioral data, and devising new ways to collect data for such optimization. In retail stores, such data can be used for replenishing the shelves with missing products, for deciding where to place given products, or for targeted advertising based on consumers' behavior.

The prior systems and methods for collecting data can be less than ideal in at least some respects. Prior monitoring devices such as cameras for tracking customers are subject to gross privacy concerns. Alternative solutions such as use of Radio Frequency Identification (RFID) on products are cumbersome, costly, and cannot be used for tracking customers and their behavior.

In light of the above, an improved monitoring devices and systems that overcome at least some of the above-mentioned deficiencies of the prior monitoring devices and systems would be beneficial. Ideally, such monitoring device would be a compact, integrated with other devices, configured to track objects and customers, sufficiently rugged and low in cost to be practical for end-user monitoring of items, convenient and convenient to use.

SUMMARY OF THE INVENTION

In accordance with a first embodiment, there is provided a radar system for monitoring an area in a retail environment, said area comprising one or more objects, the system comprising: at least one antenna array comprising a plurality of electromagnetic antennas; a transmitter subsystem for applying RF (radio-frequency) signals to said plurality of electromagnetic antennas; a receiver unit for receiving RF signals from said plurality of electromagnetic antennas; and at least one processor, wherein the at least one processor is configured to: convert the received RF signals into one or more images; analyze the one or more images based on object identification method or movement tracking method to generate data, said data comprises one or more of: number of said one or more objects in said area, the type of said objects; movements of said one or more objects in said area.

In an embodiment, the one or more objects are one or more customers and wherein the at least one processor is configured to identify these one or more customers and the movement of these customers.

In an embodiment, the object identification method comprises: subtracting an initial image representing the leakage radiation between antenna elements in said plurality of electromagnetic antennas and a captured background radiation image of an empty area; finding local peaks in the subtracted image by taking the local derivative for each direction in each voxel in the subtracted image; filtering the identified local peaks by thresholding the intensity value interpolated from a pre-calculated table depending on the relative distance of the identified objects from the radar system; clustering the peaks into groups according to a known geometry of the identified objects and identifying the number of objects in the area of the monitored environment.

In an embodiment, the identification method further comprises: classifying the formed clusters into lanes on the area to identify which object of said one or more objects is missing from each lane by comparing the number of objects in the current image to the previous image.

In an embodiment, the movement tracking method comprises: averaging a number of generated images of the one or more images over time to filter out non-moving objects; filtering out the averaged images false targets identifications; detecting real targets by finding peaks in the image intensity; clustering the peaks into a number of possible identified objects; tracking the identified objects location using a prediction filter.

In an embodiment, the movement tracking method further comprises: classifying the identified objects into two defined groups: passersby customers and interested customers.

In an embodiment, the area comprises one or more shelves holding one or more items and wherein the at least one processor is configured to estimate the occupancy of items on the shelf over time.

In an embodiment, the system comprising monitoring the items on the shelf being moved by the customer.

In an embodiment, at least one antenna array is a MIMO (Multiple Input Multiple Output) antenna array.

In an embodiment, the system comprising at least two linear arrays of antennas, wherein at least two of said at least two linear arrays are orthogonal to each other.

In an embodiment, the system comprising at least four linear arrays of antennas, wherein at least two of said at least four linear arrays of antennas are orthogonal to each other and at least two of said at least four linear arrays of antennas are parallel to each other.

In accordance with a second embodiment, there is provided a method for monitoring an area in a retail environment, said area comprising one or more objects, the method comprising: using at least one processor to: receive one or more RF signals from a radar system, wherein said radar system comprises at least one antenna array comprising a plurality of electromagnetic antennas; convert the one or more received RF signals into one or more images; analyze the one or more images based on object identification method or movement tracking method to generate data, said data comprises one or more of: number of said one or more objects in said area, the type of said objects; movements of said one or more objects in said area.

In an embodiment, the method comprising further analyzing the generated data to yield additional data.

In an embodiment, the objects are items on shelves and one or more customers in said area.

In an embodiment, the additional data comprises one or more measurements.

In an embodiment, the measurements comprise one or more of: customer behavior, customer's height; customer's location; time spent in front of the shelf; items picked from the shelf; items returned to the shelf; direction of arrival and direction of departure; general and specific statics, such as behavior statistics.

In an embodiment, the method comprising comparing the measurements to one or more predefined thresholds.

In an embodiment, the method comprising generating an alert when the quantity of a given item drops below a threshold.

In an embodiment, the object identification method comprises: subtracting an initial image representing the leakage radiation between antenna elements and a captured background radiation image of an empty area; finding local peaks in the subtracted image, for example by taking the local derivative for each direction in each voxel in the subtracted image; filtering the identified local peaks by thresholding the intensity value interpolated from a pre-calculated table depending on the relative distance of the identified objects from the radar system; clustering the peaks into groups according to a known geometry of the identified objects and identifying the number of objects in the area of the environment.

In an embodiment, the movement tracking method comprises: averaging a number of generated images the one or more images over time to filter out non-moving objects; filtering out the averaged images false targets identifications; detecting real targets by finding peaks in the image intensity; clustering the peaks into a number of possible identified objects; tracking the identified objects location using a prediction filter.

Embodiments of the present invention provide a radar-based system for monitoring shelf occupancy and customer behavior in front of the shelves.

In an embodiment, the shelves are in a store. In other embodiments, the shelves are in a storage room or a warehouse. In an embodiment, the shelves are in a refrigerator or a refrigerated storage room. In an embodiment, the system is in a mobile unit such as a truck or a train.

In an embodiment, the radar is a MIMO radar. In an embodiment, the radar is a 3D imaging radar. In an embodiment, the MIMO radar comprises at least two linear subarrays of antennas. In an embodiment, two linear subarrays are orthogonal to each other. In an embodiment the MIMO radar comprises four linear antenna subarrays, two pairs of subarrays being parallel to each other, and the subarrays of one pair being orthogonal to subarrays of the second pair.

In an embodiment, the MIMO radar has a wide field-of-view. In an embodiment, the antenna elements are broad beam antennas. In an embodiment, the antennas are slot antennas having a wide E-plane beam. In an embodiment, the antennas are situated along an arc to achieve the wide field-of-view. In an embodiment, the antennas are radiating from the edge of a printed circuit board.

In an embodiment, the radar is an ultra-wideband (UWB) radar. In an embodiment, the radar is a millimeter-wave radar. In an embodiment, the radar operated in the "60 GHz" band. In an embodiment, the radar operates in the 79 GHz band. In an embodiment, the radar operates above 90 GHz. In an embodiment, the radar operates in the sub-millimeter (above 300 GHz) band. In an embodiment, the system comprises two radar modules. In an embodiment, the system comprises two radar modules operating in two different frequency bands.

In an embodiment, the radar is a LFM (chirp) radar. In an embodiment, the radar is a stepped frequency radar. In an embodiment, the radar is a pulse radar.

In an embodiment, the radar system is capable of observing the shelf only. In an embodiment, the radar system is capable of observing the customers only. In an embodiment, the radar system is capable of observing both the shelf and the customers. In an embodiment, the radar system is capable of observing the shelf, the customers, and the dynamics of the customers as they pick items from the shelf. In an embodiment, the shelf is in a cabinet, and the radar is capable of detecting people in front of the cabinet through the door of the cabinet.

In an embodiment, the radar system is provided with means to compare its measurements to thresholds. In an embodiment, the radar can generate an alert, when the quantity of a given item drops below a threshold.

In an embodiment, the radar system is provided with means to record customer behavior and customer behavior statistics. Among others, the system may record customer's height, distance from the shelf, customer's location in front of the shelf, time spent in front of the shelf, items picked from the shelf, items returned to the shelf, direction of arrival and direction of departure. The data related to height and size may be used to differentiate adults, children, and possibly pets.

BRIEF DESCRIPTION OF THE DRAWINGS

The subject matter disclosed may best be understood by reference to the following detailed description when read with the accompanying drawings in which:

FIG. 4E shows the steps of a method for identifying one or more objects and/or occupancy of objects, in accordance with embodiments;

FIG. 5 is a flowchart illustrating a method for monitoring one or more shelves in a retail environment, in accordance with embodiments;

DETAILED DESCRIPTION OF THE INVENTION

Figure 1:
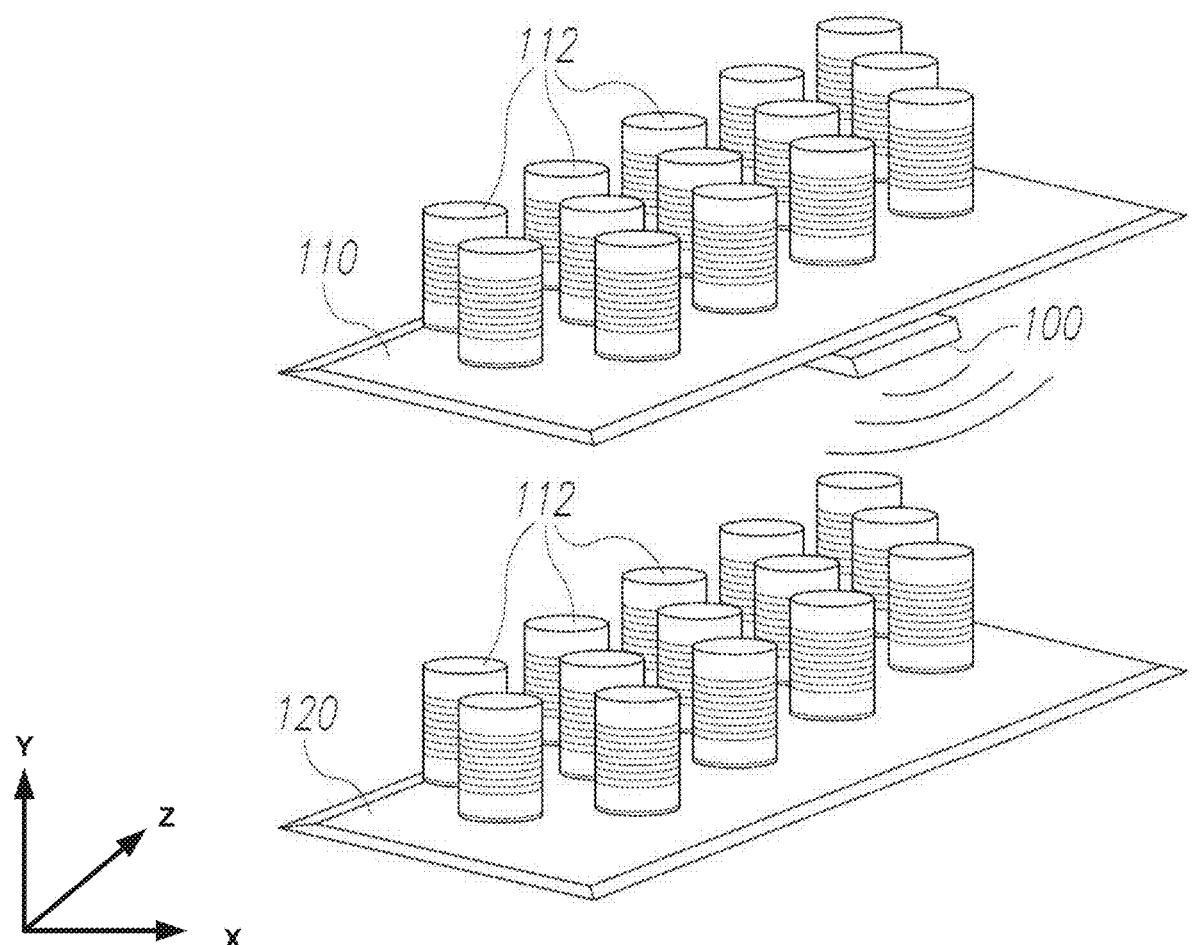
FIG. 1 illustrates a shelf with items with a radar system observing the shelf, in accordance with embodiments.

Operation in a retail environment poses numerous challenges. An example of such a challenge is that the operation environment is unknown a-priori and even empty shelves may create different radar reflections, which need to be learned and calibrated. An exemplary calibration procedure is recording the radar reflection with an empty shelf and further looking at the difference between current measurement of reflection and the reference measurement.

Another challenge is operating with multiple types of objects, and in particular, operating with multiple types of objects on the same shelf. The first solution to this challenge is to estimate object size form the 3D data obtained by the sensor. The second solution to this problem is to train the sensor by placing an object on a shelf (either an empty shelf or a partially filled shelf) to estimate the reflection produced by an object of a given type.

Yet another challenge is associated with objects located at different distances and different view angles, generating different reflection strength. This challenge is overcome by maintaining calibration of a given sensor relative sensitivity over a range of angles and distances. Maintaining such a table overcomes another challenge, which is the variability between the different sensors.

Assessment of customer's behavior poses challenges associated with eliminating erratic counts, such as a customer moving back and forth in front of the shelf or a cabinet. A solution this is to use tracking method that assigns an identification number to each candidate target in the arena in front of the sensor, forms trajectories describing the movement of each customer, and counting events associated with distinct customers.

Radar sensor data may be used to detect events of opening the door of the cabinet containing the shelf and the items.

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore, the invention is not limited by that which is illustrated in the figure and described in the specification, but only as indicated in the accompanying claims, with the proper scope determined only by the broadest interpretation of said claims.

The configurations disclosed herein can be combined in one or more of many ways to provide improved radar systems, devices and applications for retail environment. More specifically, but not exclusively, there are provided embodiments of shelf occupancy and of customers' behavioral assessment. Systems, devices and methods, in accordance with embodiments, are applicable to open shelves, closed places such as refrigerators, storage rooms and warehouses. Assessment of customer behavior may include both customers' movement in front of the shelves, as well as tracking body parts, and in particular hands during picking of objects from the shelves.

One or more components of the configurations disclosed herein can be combined with each other in many ways.

Prior to the detailed description of the invention being set forth, it may be helpful to set forth definitions of certain terms that will be used hereinafter.

The term 'target' or 'target object' or 'object' as used herein is defined as an object located in an area, for example an area in a retail environment. In some cases, the object may be a person such as a customer or an inanimate object such as a bottle, a can or door of a closet or refrigerator.

Advantageously, the use of radars in accordance with embodiments, alleviates the problem of privacy, by providing coarser images than photographic techniques. On the other hand, it provides additional information of distance to the objects and/or customers being observed. Additionally, radar systems, devices and methods, in accordance with embodiments do not depend on lighting conditions, glare, fog, mist, or condensation (as it may happen in refrigerators of refrigerated storage rooms). Moreover, use of radar systems and devices including wide-angle antenna elements allow a wide field of view without resorting to special and costly optical elements such as fish-eye lenses.

In accordance with embodiments, there are provided radar systems, devices and methods for gauging the occupancy of products on the shelves; and/or for monitoring the movements of the clients (e.g. customers) in front of the shelves; and/or for monitoring the interaction of clients with the products, such as hands being sent towards the products.

Reference is now made to FIG. 1 which illustrates two shelves 110 and 120 holding one or more items 112 such as cans and a radar system 100 configured to monitor the shelves and an area surrounding the shelves, for example, to identify the occupancy of items 112 on the shelves 110 and 120, in accordance with embodiments. In some cases, the shelves such as shelves 110 and 120 may be in a retail environment, such as a store, supermarket, grocery, pharmacy and the like. In some cases, the shelves 110 and 120 may be part of closets such as food closets in supermarkets or medicine closets in pharma and items 112 may be accordingly food cans, medicines and the like. In other cases, the shelves 110 and 120 may be in a storage room or a warehouse. In some cases, the shelves 110 and 120 are in a refrigerator or a refrigerated storage room.

According to one embodiment, the radar system 100 may be placed in proximity to the shelves and/or the items. For example, 1, 2, 3, 4, 5-10, 20, 30, 40, 50, 60 cm or more from the items 112 or shelves 110 and 120.

According to one embodiment, as illustrated in FIG. 1, the radar system 100 may be attached to one or more shelves, for example to the bottom portion of shelve 110 to monitor items 112 placed on the shelve 120 below. In accordance with embodiments, a plurality of radar systems, such as an array of radar systems are placed on the shelves, for example a radar system, such as radar system 100, is placed above or in proximity to each respective shelve 110 and 120. In accordance with embodiments, in an environment, such as a retail environment including (e.g. closet or refrigerator including N shelves N radar systems may be used to detect objects places on each shelf of the N shelves.

According to one embodiment, the radar system 100 has a wide field of view, for example, the field of view of each radar system may be between 160°-180° or more for both axis (e.g. along X-Y plane and/or X-Z plane in a Cartesian X-Y-Z axis), so it can detect anything on the sides and below the respective shelve.

In an embodiment, the radar system 100 may be placed in a mobile device or system.

Figure 2:
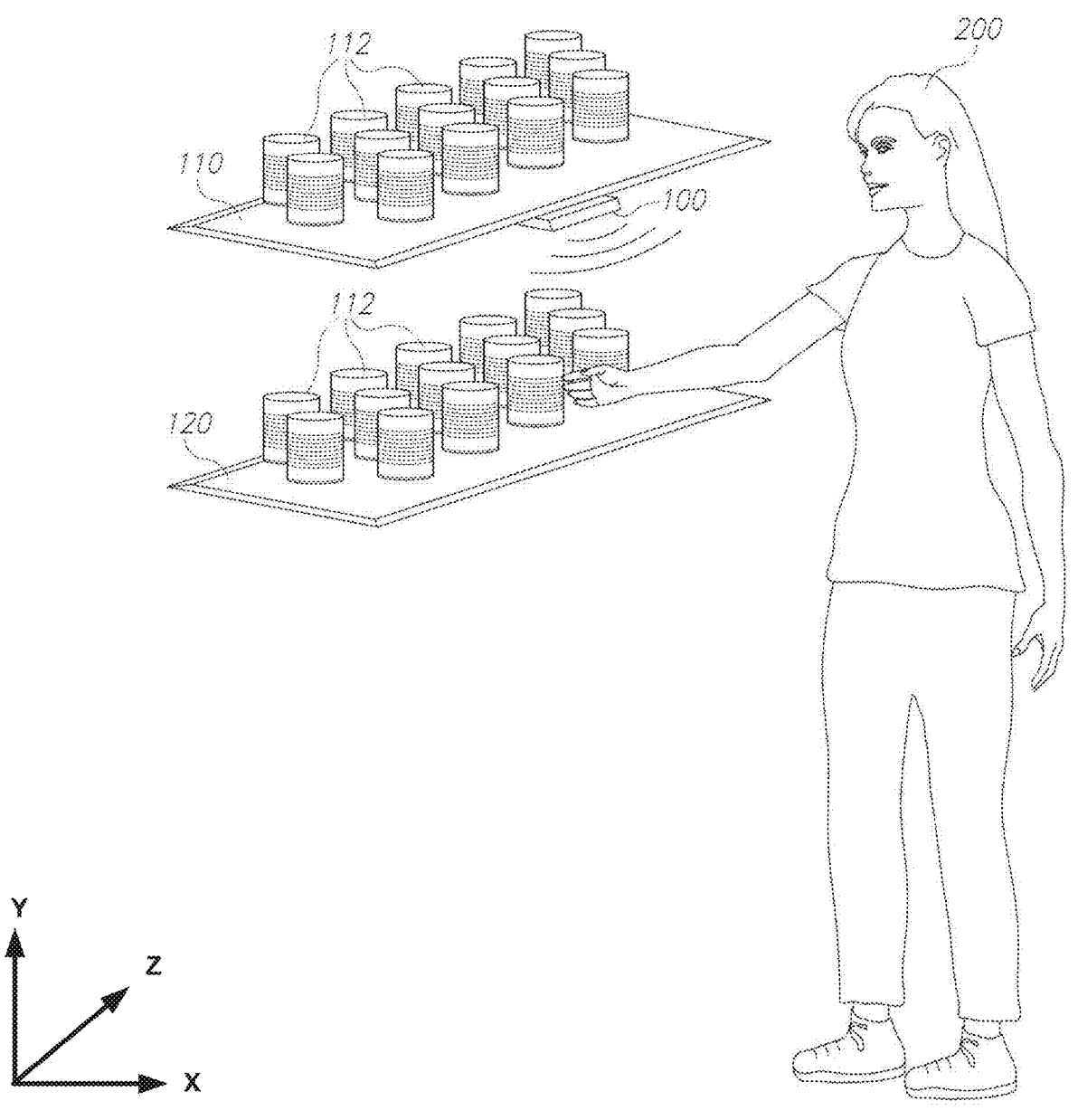
FIG. 2 illustrates a shelf with a radar observing customers in front of the shelf, in accordance with embodiments.

FIG. 2 illustrates the two shelves 110 and 120 holding one or more items 112 such as cans wherein the radar system 100 is configured and enabled to monitor one or more customers such as customer 200 standing in front of the shelves and/or identify one or more movements of the customer 200, for example, movement of the customer's hand approaching and picking the cans 112 from shelve 120, in accordance with embodiments.

According to one embodiment, the radar observing range for detecting objects such as cans or customers may be 1, 2, 3, 4 or more meters.

Figure 3A:
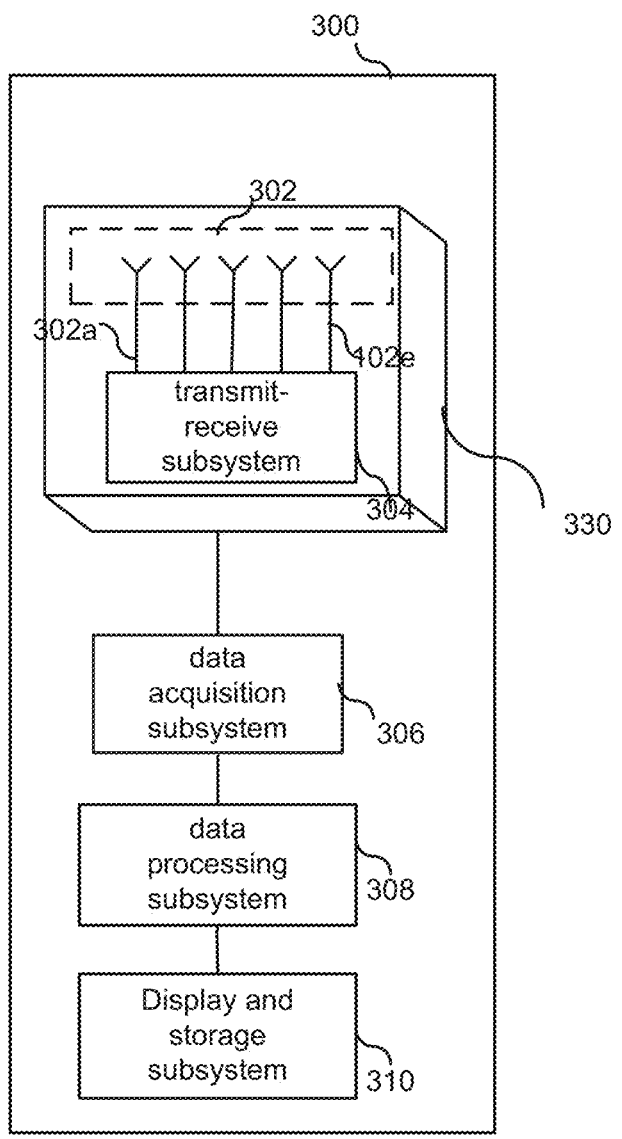
FIG. 3A illustrates a radar system configured to be attached or included in one or more objects such as shelves in a retail environment and monitor items on the shelves and/or customers in front of the shelf, in accordance with embodiments.

FIG. 3A illustrates a radar system 300 configured to be attached or included in one or more objects such as shelves as illustrated in FIG. 1 and FIG. 2 or walls or ceiling and/or systems or devices such as electronic devices (e.g. cameras or lights) in a retail environment and monitor items on the shelves and/or customers in front of the shelf, in accordance with embodiments.

According to one embodiment, the radar system 300 may a MIMO (Multiple-input multiple-output) radar.

In accordance with some embodiments, the radar system 300 may be a wideband 3D imaging such as a MIMO radar, configured and enabled to generate one or more 3D images from reflected RF signals and analyze the generated 3D images to provide meaningful insights about the retail environment as explained hereinbelow in details.

An example of a MIMO radar device may be a 60 GHz MIMO radar illustrated at https://walabot.com/makers incorporated herein by reference in its entirety.

In accordance with embodiments, the radar system 300 is configured to capture, characterize, process, and/or identify and/or define one or more objects and/or the movement of these one or more objects. For example, the system 300 is configured to provide occupancy state of items, for example on a shelf in a store and provide the identification results relating to the identified occupancy for use in any desired fashion (e.g., for further processing, to store in memory, to display, to use by various applications running on the radar system or any external portable device such as a smartphone, and/or to export to other devices, or other uses).

In an embodiment, the radar system 300 is capable of observing a shelf only, such as shelf 120 of FIG. 1. In an embodiment, the radar system 300 is capable of observing the customers only, such as customer 200 of FIG. 2. In an embodiment, the radar system is capable of observing both the shelf and the customers. In an embodiment, the radar system is capable of observing the shelf, the customers, and the dynamics of the customers as they pick items from the shelf. For example, the radar system 300 is configured to identify one or more movements of one or more customers as they approach the shelf and pick one or more items from the shelf.

In an embodiment, the shelf is in a cabinet, and the radar system is capable of detecting people (e.g. customers) in front of the cabinet through the door of the cabinet.

In one embodiment, the radar system 300 may be a multi-layer structure implemented at least in part with printed circuit board techniques using appropriate dielectric materials. Commonly used materials are glass-epoxy, Teflon-based materials. Layers of high-dielectric-constant materials can be incorporated to match the antennas to materials under test.

According to one embodiment, the radar system 300 may include one or more antenna subarrays 302, a transmit/receive subsystem 304, a data acquisition subsystem 306, a data processing subsystem 308 and a display, storage and analysis subsystem 310.

According to one embodiment, the one or more antenna subarrays 302 and/or the transmit/receive subsystem 304 and/or the data acquisition subsystem 306 and/or the data processing subsystem 308 and/or the storage and analysis subsystem 310 may be embedded or attached to a printed circuit board (PCB).

In an embodiment, the antennas of the one or more antenna subarrays 302 may radiate from the edge of the printed circuit board.

According to some embodiments, the radar system 300 comprises a housing for holding the antenna array (e.g. the one or more subarrays of antennas) and/or other subsystems. For example, the housing may be circular shaped or include other shapes as illustrated in FIGS. 3B-3E for an optimal field of view. The housing shape may include but is not limited to, a ball, cube, a cage and so on.

According to one embodiment, each of the one or more antenna subarray 302 may include multiple antennas, typically between a few and several dozen (for example 5, 10, 20, 30 or more) antennas, such as antenna 302a-302e. The antennas can be of many types known in the art, such as printed antennas, waveguide antennas, dipole antennas or "Vivaldi" broadband antennas. The antenna array can be linear and/or two-dimensional, and/or three-dimensional flat or conformal to the region of interest.

According to one embodiment, the radar system 300 may be 3D (three-dimensional) imaging radar.

According to one embodiment, the radar system 300 may a MIMO (Multiple-input multiple-output) radar. For example, the antenna subarrays may include multiple antennas where each transmit antenna radiates an arbitrary waveform independently of the other transmitting antennas.

In an embodiment, the radar system (e.g. the MIMO radar) has a wide field-of-view, for example between 160°-180° or more for both axis (e.g. along x-y plane and/or X-Z plane in a Cartesian X-Y-Z axis). In an embodiment, the MIMO radar bands may be 60 Ghz-57-71 Ghz, 80 GHZ-80-100 Ghz. In an embodiment, the antenna elements are broad beam antennas. In an embodiment, the antennas are slot antennas having a wide E-plane beam.

According to one embodiment, the antenna array can be a linear antenna array and/or two-dimensional antenna array and/or flat antenna array and/or antenna array conformal to the region of interest. In an embodiment, the antennas are radiating from the edge of a printed circuit board.

In an embodiment, the radar system 300 is an ultra-wideband (UWB) radar. In an embodiment, the radar system is a millimeter-wave radar. In an embodiment, the radar system may operate in the "60 GHz" band. In an embodiment, the radar system operates in the 79 GHz band. In an embodiment, the radar operates above 90 GHz. In an embodiment, the radar operates in the sub-millimeter (above 300 GHz) band. In an embodiment, the radar system comprises two radar modules. In an embodiment, the system comprises two radar modules operating in two different frequency bands.

In an embodiment, the radar system 300 is a LFM (chirp) radar. In an embodiment, the radar system 300 is a stepped frequency radar. In an embodiment, the radar system is a pulse radar.

According to some embodiments, the antenna array 302 may be an array of flat broadband antennas, for example, spiral-shaped antennae. The antenna array 302 may include a layer of matching material for improved coupling of the antenna radiation to the materials or objects under test. The unique and optimized shape of the antenna array enables their use in size-limited devices, such as thin, small-sized devices. In addition, the use of an antenna array made as flat as possible, for example in a printed circuit, allows for attachment of the radar system 300 to any device known in the art, as it does not take up much space in the device, it is not cumbersome, nor does it add significant weight to the device.

Figure 3B:
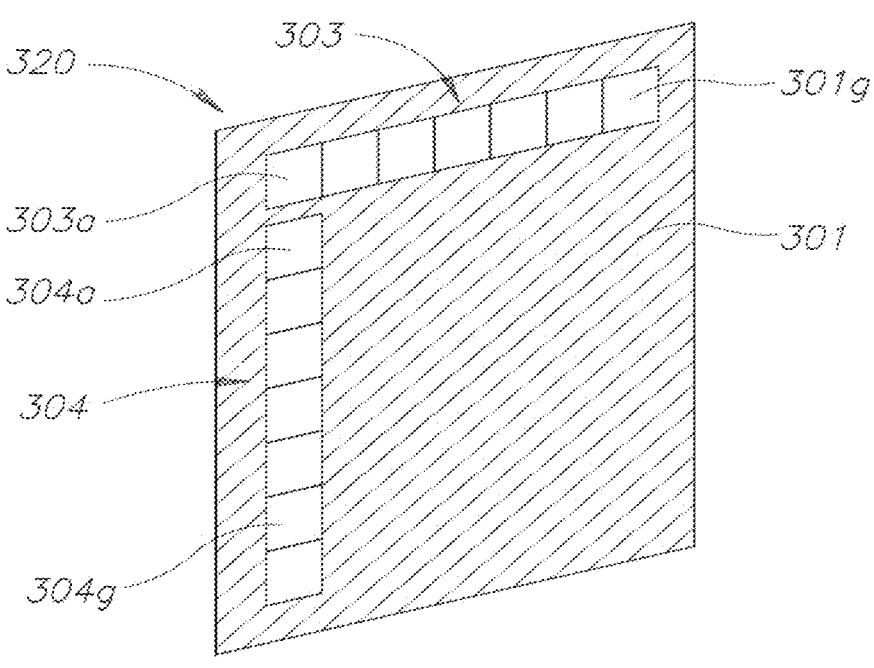
FIG. 3B illustrates a MIMO radar with two antenna subarrays, in accordance with embodiments.

According to one embodiment, the radar system may include at least two antenna subarrays, such as linear subarrays of antennas. For example, as illustrated in FIG. 3B a radar system 320 may include two linear antenna subarrays, e.g. a first antenna subarray 303 and a second antenna subarray 304 embedded in and/or attached to PCB 301. In some cases, each linear subarray includes seven antennas (e.g., antennas 330a-303g and antenna 304a-304g). According to one embodiment, the first subarray of antennas 303 may be Rx and the second subarray of antenna 304 may be Tx. According to some embodiments, the two subarrays of antennas 303 and 304 may be orthogonal to each other, for example, the antenna subarray 303 may be located longitudinally at the upper or low sections of the PCB 301 while the antenna subarray 304 may be located along the width of the PCB 301 (e.g. at the sides of the PCB 301). According to some embodiments, the radar system 320 may be a MIMO radar system.

Figure 3C:
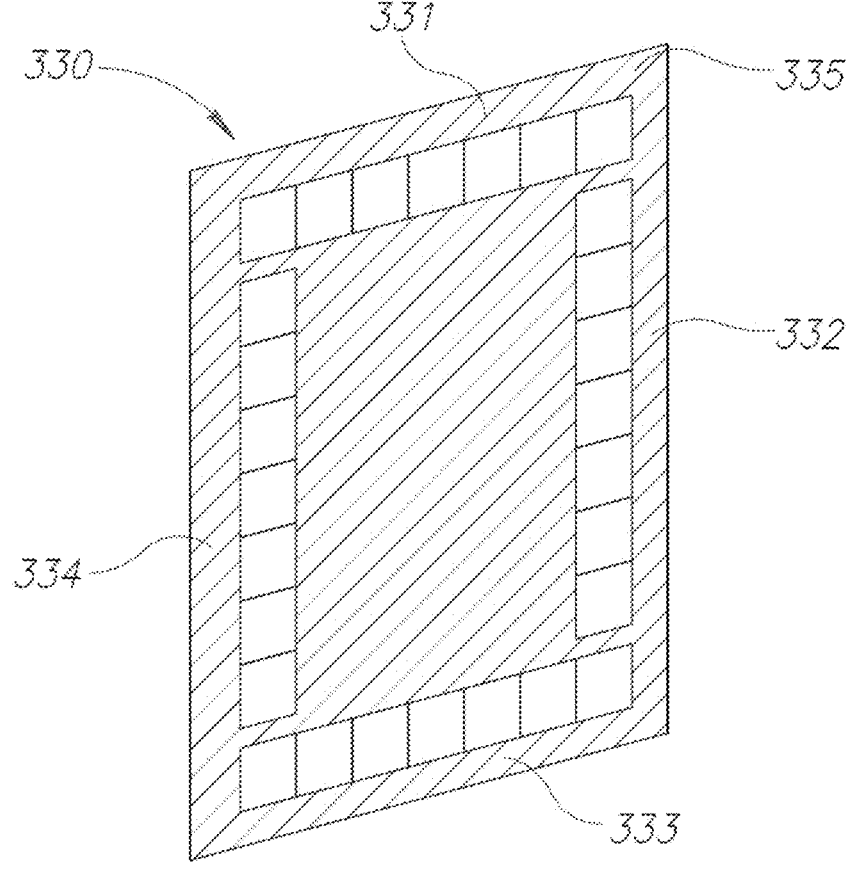
FIG. 3C illustrates MIMO radar with four antenna subarrays, in accordance with embodiments.

According to another embodiment, the radar system may include four subarrays of antennas, such as four linear subarrays of antenna, e.g. two pairs of subarrays being parallel to each other wherein subarrays of one pair being orthogonal to subarrays of the second pair. For example, as illustrated in FIG. 3C, radar system 330 may include subarray of antenna 331, subarray of antenna 332, subarray of antenna 333 and subarray of antenna 334 embedded or attached to PCB 335. In some cases, the four subarrays of antennas may be located in the sides of the PCB 301, for example few microns (e.g. 1-100 microns or more) from the sides of the PCB forming a frame of antenna subarrays surrounding (e.g. partially surrounding) the PCB 335. According to one embodiment, each subarray may include seven antennas.

Figure 3D:
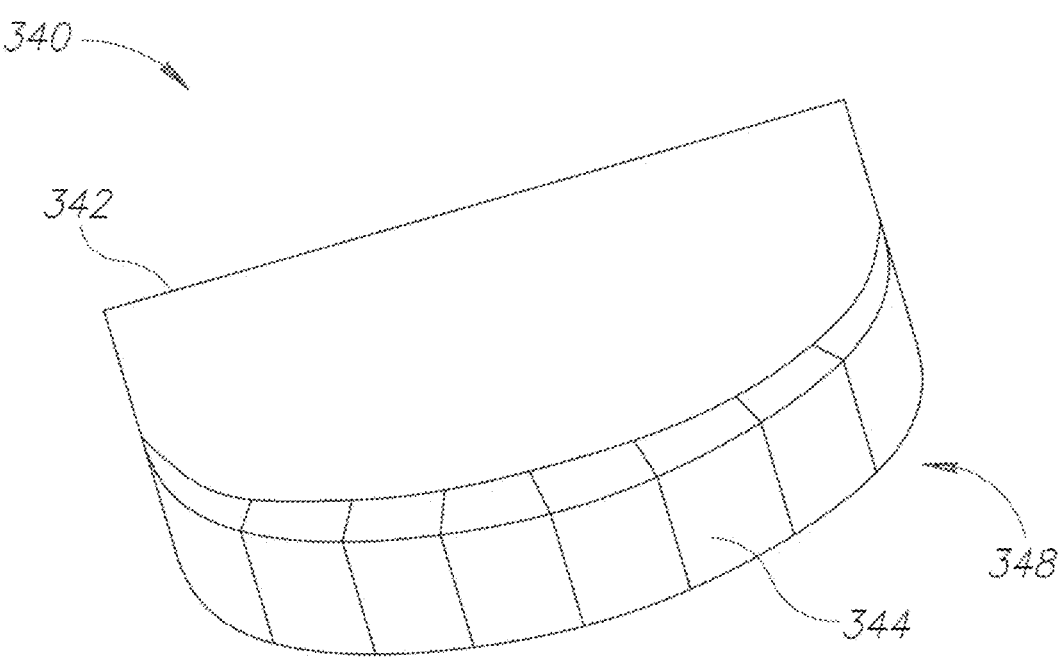
FIG. 3D illustrates MIMO radar with an array of antennas situated on an arc, in accordance with embodiments.

According to another embodiment, as illustrated in FIG. 3D, the radar system may be arc-shaped including an array of antennas situated on the arc-shaped radar system. For example, a radar system 340 may include a flat-shaped section 342 which typically faces or attached to a wall and/or to the inner section of a shelf and a curve shape section 344 which faces the environment (e.g. retail environment). In an embodiment, one or more antennas or one or more subarray antennas such as seven antennas of array 348 situated along an arc-shaped section to achieve a wide field-of-view.

Figure 3E:
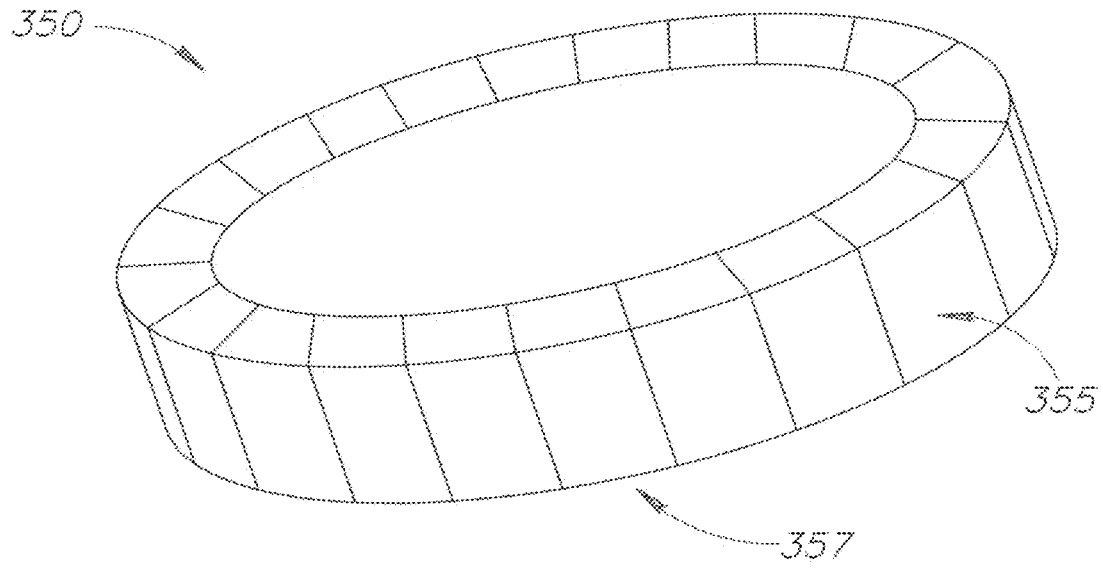
FIG. 3E illustrates MIMO radar with an array of antennas situated on a circle, in accordance with embodiments.

According to another embodiment, the radar system shape may be circular including antennas such as one or more subarray of antennas situated (e.g. attached or embedded) along the perimeter of the radar system. For example, as illustrated in FIG. 3E, a radar system 350 may include an array of antennas 355 attached to an external perimeter 357 of the radar system 350.

The transmit/receive subsystem 304 is responsible for the generation of the microwave signals, coupling them to the antennas, such as antennas 302a-302e, reception of the microwave signals from the antennas and converting them into a form suitable for acquisition. The signals (e. g. RF signals) can be pulse signals, stepped-frequency signals, chirp signals and the like. The generation circuitry can involve oscillators, synthesizers, mixers, or it can be based on pulse-oriented circuits such as logic gates or step-recovery diodes. The conversion process can include down conversion, sampling, and the like. The conversion process typically includes averaging in the form of low-pass filtering, to improve the signal-to-noise ratios and to allow for lower sampling rates. The transmit/receive subsystem 304 can perform transmission and reception with multiple antennas at a time or select one transmit and one receive antenna at a time, according to a tradeoff between complexity and acquisition time.

Specifically, the transmit/receive subsystem 304 includes one or more transmitters and receivers for applying and receiving accordingly RF (radio-frequency) signals or coupled RF signals to or from the antenna array. The RF signals may be wideband or ultra-wideband signals.

The data acquisition subsystem 306 collects and digitizes the signals from the transmit/receive subsystem 304 while tagging the signals according to the antenna combination used and the time at which the signals were collected. The data acquisition subsystem will typically include analog-to-digital (A/D) converters and data buffers, but it may include additional functions such as signal averaging, correlation of waveforms with templates or converting signals between frequency and time domain.

The data processing subsystem 308 is responsible for converting the collected signals into a set of responses and further analyzing the set of responses to generate data including one or more of: measurements and/or characterization of the environment (e.g. where the radar system is positioned) and identification of one or more objects such as the one or more customers and/or items located in an area, such as a specific area in the environment.

The processing subsystem 308 may be in wired or wireless communication with devices and other processors. For example, output from processing subsystem 308 may trigger a process within the processing subsystem 308 or may be transmitted to another processor or device to activate a process at the other processor or device.

According to another embodiment, the processing subsystem 308 may be external to the radar system 300 and may be embedded in other systems or devices.

In accordance with embodiments, the data processing subsystem 308 is configured and enabled to perform the algorithms for converting the sets of responses, for example into data such as image data, including the detected items and/or customers and/or their movement.

An example of an algorithm for converting the sets of responses may be for example Delay and Sum (DAS) algorithm.

The DAS algorithm for reconstructing an image from impulse responses of the medium is well-known, and is used here as a reference. For each point r in some designated volume in the three-dimensional space, and for each antenna element pair (from antenna element i to antenna element j) the expected delay $T_{ij}(r)$ from antenna element i to point r and back to antenna element j is calculated, considering the propagation velocity through the medium (which is assumed to have known electrical properties). Then the reconstructed image at location r is created by summing the estimated impulse responses of each pair i,j after shifting them by delay $T_{ij}(r)$, i.e.

$$s(r) = \Sigma_{ij} h_{ij}(T_{ij}(r)) \qquad (1)$$

where the summation is over all antenna element pairs.

Assuming a reflector exists at point r then we expect a positive pulse to exist at position $T_{ij}(r)$ in all, or most, pairs, creating high intensity of the reconstructed image at this point.

DAS assumes the responses $h_{ij}(t)$ refer to the impulse response of the medium under test. However, since the components involved in the measurement have responses varying in frequency and space, the direct measurement involves a combination of the medium response and the response of these components. The antenna elements used for transmission and reception proposes are usually of a high-pass nature, not being capable of transmitting very low frequencies. The frequency response of transmission/receive microwave circuits may exhibit variations due to production, aging, and temperature, and it is preferable to measure that response and take it into account.

Typical image reconstruction algorithms (such as DAS) assume perfect antenna elements, and therefore the above effects are compensated for before applying the reconstruction algorithm, e.g. by dividing the frequency response obtained from the measurement by the known frequency response of the components. As mentioned previously, this pre-calibration compensation is sub-optimal as it amplifies noise, and does not take into account that some antenna elements at some frequencies see a target better than others, nor does it apply to location-dependent amplitude and phase shift variations.

Examples for such algorithms may be found in US Patent Application Publication No. US20140066757, entitled "WIDEBAND RADAR WITH HETEROGENEOUS ANTENNA ARRAYS" which application is incorporated by reference herein in its entirety.

According to one embodiment, processing subsystem 308 is responsible for Doppler processing as well, in which changes in the response over time are taken into account along with the response itself. The data processing unit is usually implemented as a high-performance computing platform, based either on dedicated Digital Signal Processing (DSP) units, general purpose CPUs, or, according to newer trends, Graphical Processing Units (GPU). In some embodiments, the acquisition unit and/or processing unit may be connected to other sensors and integrate data from those sensors to construct one or more images.

In accordance with embodiments, the data processing subsystem 308 is further configured to analyze the data to yield one or more measurements for identifying the type and/or number of: one or more users (e.g. customers), and/or objects (e.g. items such as cans) in the environment (e.g. retail environment). For example, the quantity of a given item in a shelve and/or closet, the number of customers in the retail environment, occupancy status (e.g. over time) at each observed shelve.

Figure 4A:
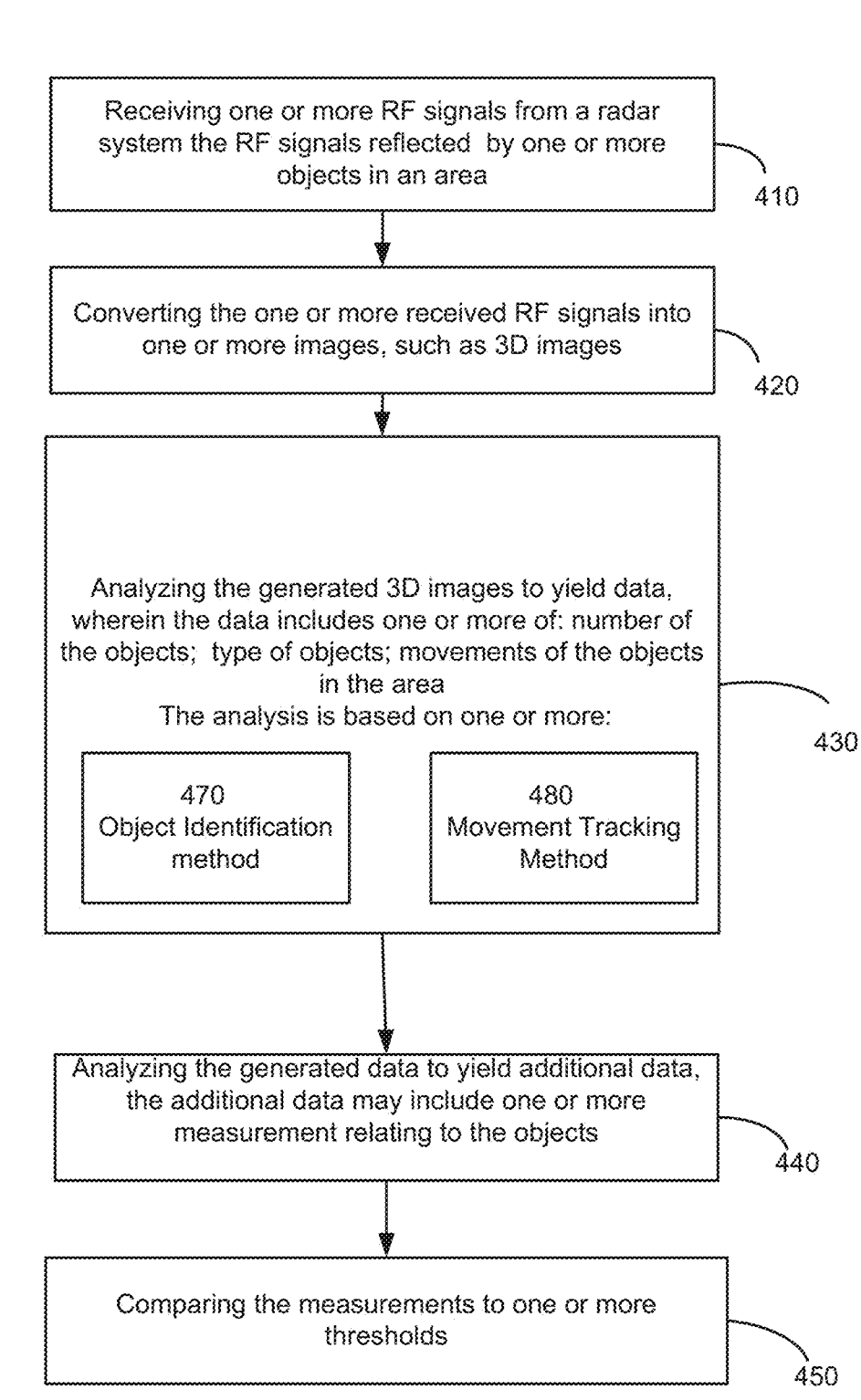
FIG. 4A is a flowchart illustrating a method for monitoring an area comprising one or more objects, in accordance with embodiments.
Figure 4B:
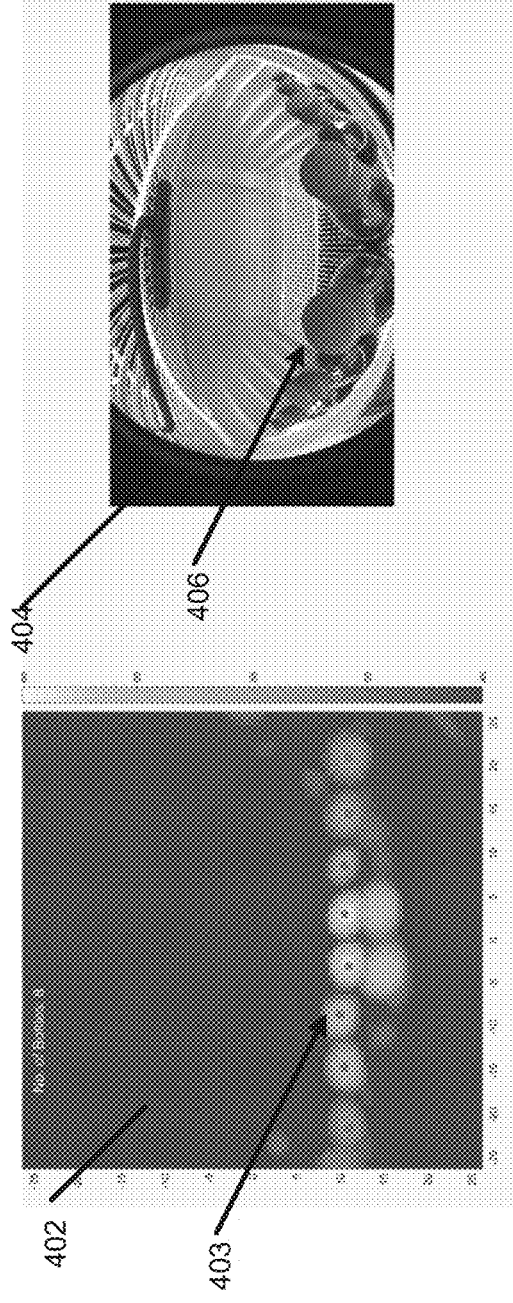
FIG. 4B shows a 3D image of bottles in a refrigerator captured by the radar system, in accordance with embodiments.
Figure 4C:
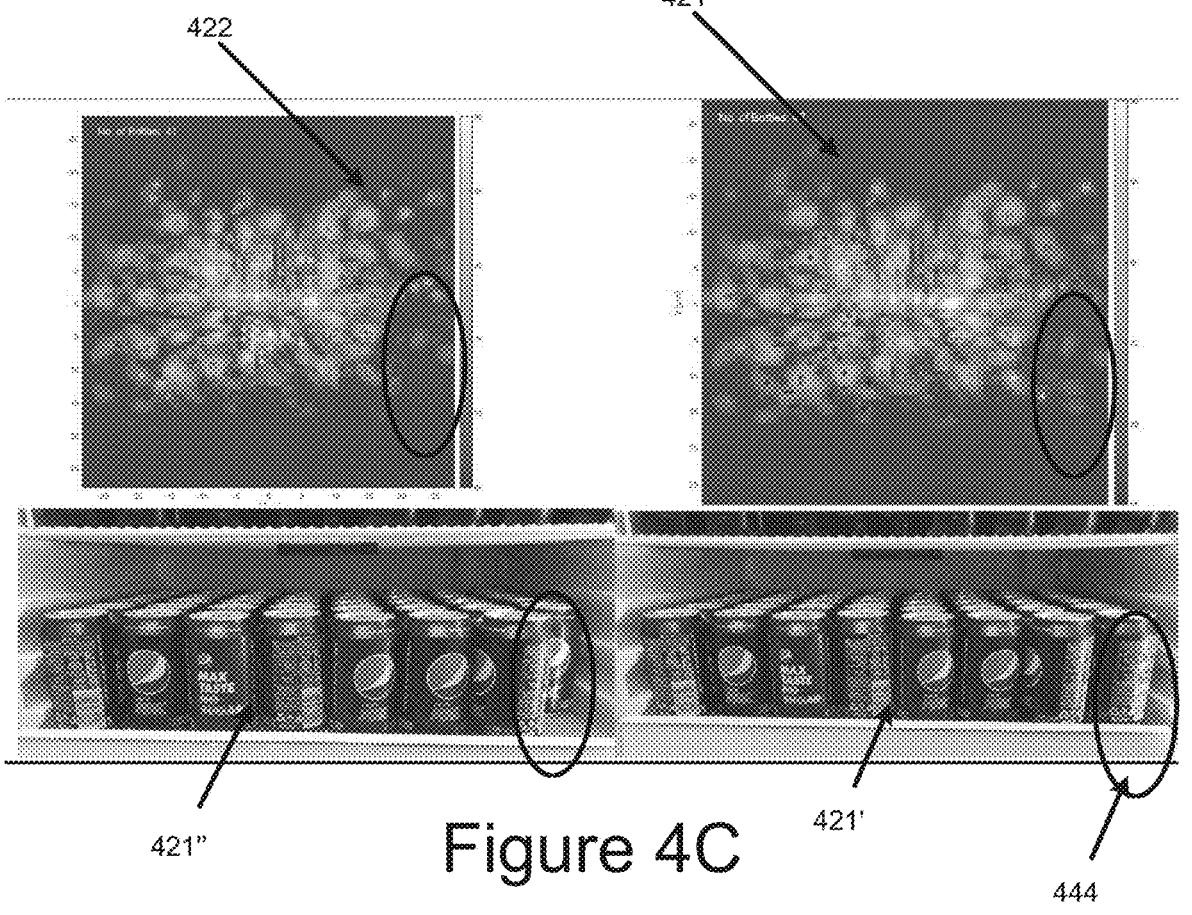
FIG. 4C shows two generated RF images captured over time including RF reflections of respective coke cans placed in a refrigerator shelve, in accordance with embodiments.
Figure 4D:
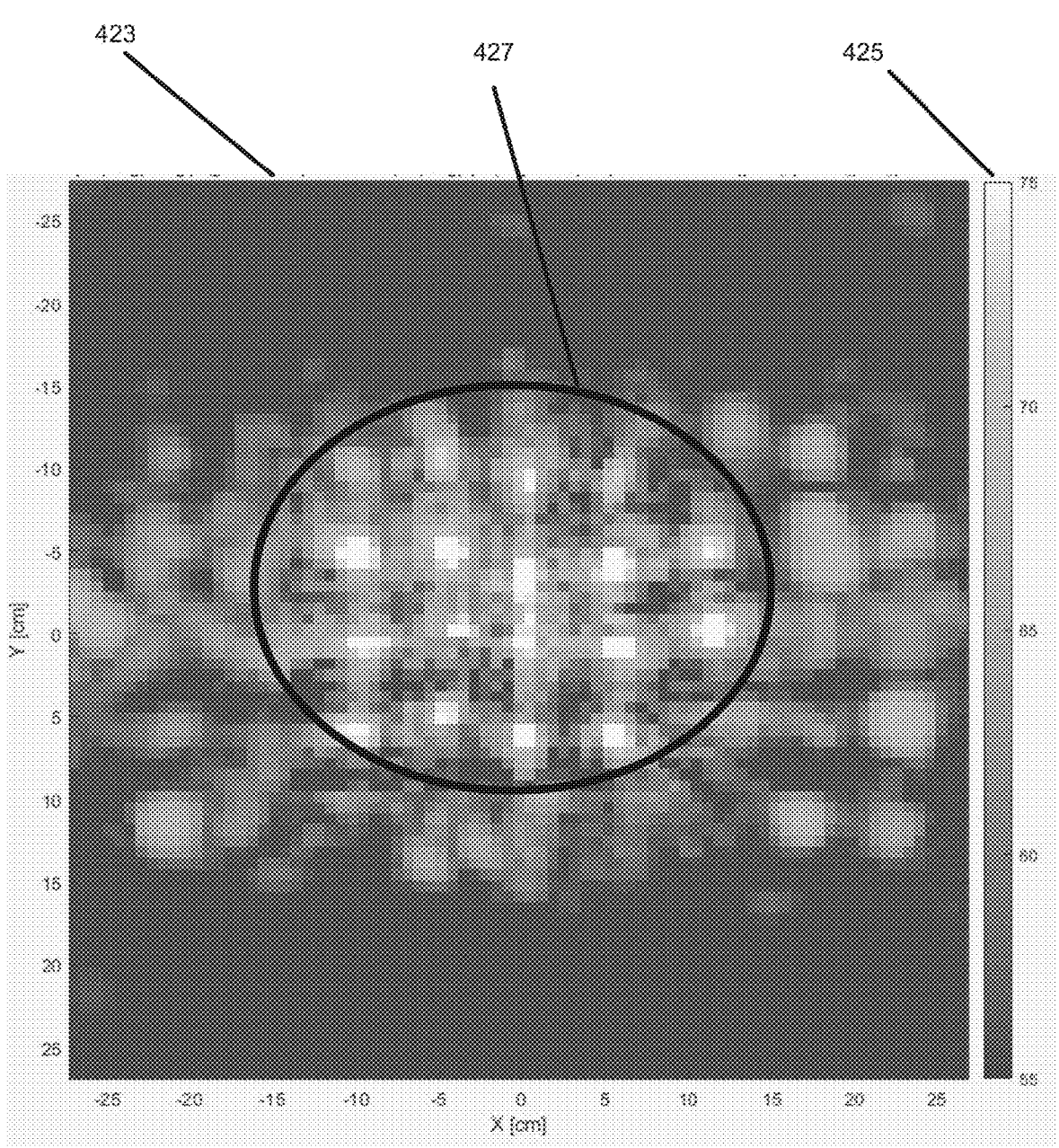
FIG. 4D shows an example of image constructed by coherent summation of images (CSI), in accordance with embodiments.
Figure 4F:
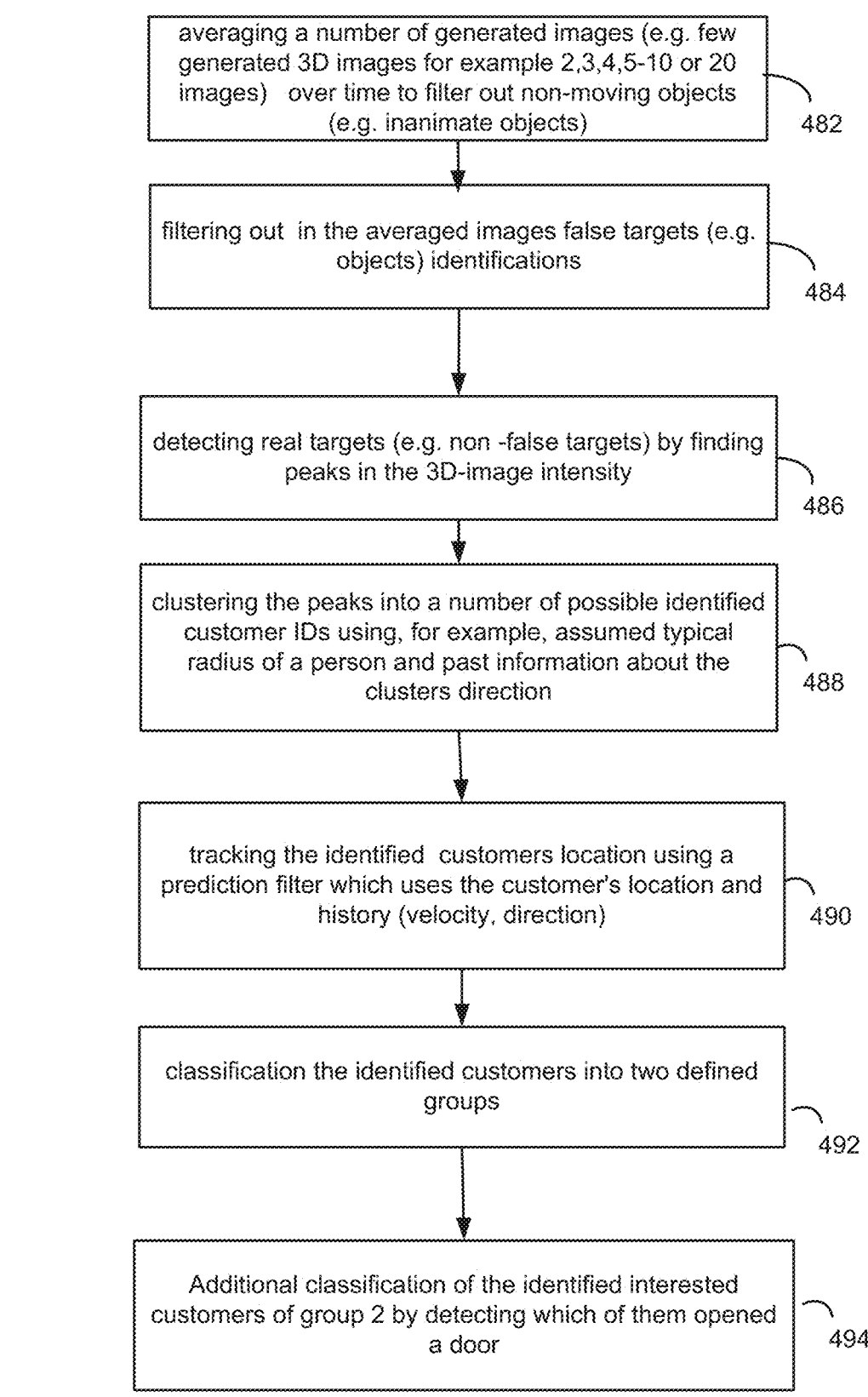
FIG. 4F shows the steps of a method for tracking movements such as customer movements and/or further identifying passersby customers and interested customers, in accordance with embodiments.

In accordance with embodiments, the data processing subsystem 308 is further configured to continuously receive data (e.g. over time) from the data acquisition subsystem 306 and continuously analyze the data to monitor one or more of: customer behavior; customer's height; customer's location (e.g. in front of the shelf or at any predefined or selected location), time spent in front of the shelf; items picked from the shelf; items returned to the shelf; direction of arrival and direction of departure as explained herein below in respect to FIGS. 4A, 4E and 4F.

In some embodiments, the obtained and analyzed data may be further analyzed to provide general and specific statics, such as behavior statistics, etc.

In an embodiment, the data processing subsystem 308 is further configured and enabled to compare its measurements to one or more predefined thresholds. In an embodiment, the data processing subsystem 308 is further configured to generate an alert, for example when the quantity of a given item drops below a threshold.

The data related to height and size may be used to differentiate adults, children, and possibly pets.

In an embodiment, the radar system 300 includes a recording module configured and enabled to record and store the customer behavior and customer behavior statistics. Among others, the system may record customer's height, distance from the shelf, customer's location in front of the shelf, time spent in front of the shelf, items picked from the shelf, items returned to the shelf, direction of arrival and direction of departure. The data related to height and size may be used to differentiate adults, children, and possibly pets.

A final step in the process is making use of the resulting data such as image, either in the form of visualization, display, storage, archiving, or input to feature detection algorithms. This step is exemplified in FIG. 3A as display and storage subsystem 310. In some embodiments, display and storage subsystem 310 may be a console in a mobile device and is typically implemented as a handheld computer such as a mobile telephone or a table computer with appropriate application software.

According to system type, the computer can be stationary, laptop, tablet, palm or industrial ruggedized. It should be understood that while FIG. 3A illustrates functional decomposition into processing stages, some of those can be implemented on the same hardware (such as a common processing unit) or distributed over multiple (such as graphical processing unit, GPU) and even remote pieces of hardware (such as in the case of multiprocessing or cloud computing).

According to one embodiment, subsystems 306, 308 and 310 may be part of the radar system 300, as shown in FIG. 3A. Alternatively, subsystems 306, 308 and 310 may be separated from the radar system 300, included for example in an external and/or remote system. Alternatively, the radar system 300 may be included within a housing 330 such as case or a jacket configured to be releasable (i.e. connected or disconnected) and attached to a shelve or wall, for example in a retail environment.

According to one embodiment, the housing 330 may include the antenna array 302 and the transmit/receive-subsystem 304 which may be part of the housing 330 which is electrically or wirelessly connected to the other subsystems, for example through a dedicated connection such a USB connection, wireless connection or any connection known in the art.

According to some embodiments, the housing 330 may be attached or included in a portable device, and the antenna array 302 and transmit-receive subsystem 304 may utilize the portable device's own data acquisition, data processing display, storage and analysis subsystems.

FIG. 4A is a flowchart 400 illustrating a method for monitoring an area comprising one or more objects, in accordance with embodiments. In some cases, the area may be or may be included in an environment, such as a retail environment, and the method includes monitoring one or more items in one or more shelves in the retail environment and/or one or more customers.

Some stages of method 400 may be carried out at least partially by at least one computer processor, e.g., by processing subsystem 308 and/or other computing unit. Respective computer program products may be provided, which comprise a computer-readable storage medium having computer-readable program embodied therewith and configured to carry out of the relevant stages of method 400. In other embodiments, the method includes different or additional steps than those described in conjunction with FIG. 4. Additionally, in various embodiments, steps of the method may be performed in different orders than the order described in conjunction with FIG. 4A.

Step 410 comprises receiving one or more RF signals from a radar system, such as radar system 300. Specifically, step 410 comprises receiving from the data acquisition subsystem 306 one or more signals reflected for example by one or more objects included in the environment (e.g. retail environment) and received at the array of antennas such as subarray of antennas 303 (Rx subarray).

Step 420 comprises converting the one or more received RF signals into a set of responses. Specifically, the one or more received RF signals are converted (e.g. reconstructed) to one or more images, such as 3D images (three dimensional). In some embodiments the one or more 3D images may be generated using one or signal processing techniques (e.g. radar imaging algorithm). Non limiting examples of such signal processing techniques include delay-and-sum beamforming, range migration algorithms and the like. The generated 3D images include one or more captured objects such as moving objects (e.g. customers) and/or inanimate objects such as bottles, cans and the like. For example, FIG. 4B shows a 3D image 402 (e.g. radar image) of bottles in a refrigerator captured by a radar system, such as system 300, in accordance with embodiments. Specifically, radar image 402 corresponds to image 404 including eight bottles 406 positioned in the back of the refrigerator.

Step 430 comprises analyzing the generated images (e.g. 3D images) to yield data relating to the area (e.g. shelves and/or closet and/or refrigerator and the like) in the captured environment. In one embodiment, the generated 3D images are analyzed to identify one or more objects in the environment. In some embodiments, the extracted data comprises one or more of: number of objects (e.g. bottles, cans) in the area (e.g. shelve); and/or the type of the objects; and/or movements of one or more customers in the environment.

In accordance with embodiments, the generated 3D images may be analyzed to identify the number of objects in the area; and/or which object is missing or was bought by a customer based on an identification method 470.

In accordance with another embodiment, the generated 3D images may be analyzed to track and/or monitor one or more users (e.g. customers) moving in the area and optionally identify based on one or more movement tracking methods such as customer movement tracking method 480 passersby customers and interested customers.

In some cases, the objects may be one or more customers and/or items in a retail environment and step 440 may optionally comprise, further analyzing the generated data of step 430 to yield additional data. In some cases, the additional data may include one or more measurements including, for example, the identified customer behavior, customer's height; customer's location (e.g. in front of the shelf or at any predefined or selected location), time spent in front of the shelf; items picked from the shelf; items returned to the shelf; direction of arrival and direction of departure; general and specific statics, such as behavior statistics, etc.

Step 450 comprises comparing the measurements to one or more predefined thresholds. In an embodiment, the data processing subsystem 308 is further configured to generate an alert, for example, when the quantity of a given item drops below a threshold.

FIG. 4D shows an example of image 423 constructed by coherent summation of images (CSI). In accordance with embodiments, CSI of image 423 represents a concatenation of DAS images of for example a shelve holding one or more objects (e.g. bottles) having a total thickness of around 5-30 cm scanned along 25 cm. Accordingly, the X-axis of image 423 represents the summed images obtained longitudinally of around 25 cm scanned shelve, while the Y-axis represents cross-sections of measured energy level along the shelve thickness. For illustration matters, the energy level is presented by a color scale column 425 (e.g. grayscale) where dark color corresponds to low energy level and bright color to high energy level. Specifically, FIG. 4D shows a cluster 427 of "bright" or "stain intensity" areas which are identified as objects (e.g. bottles) on the shelve and represented by the strength of a bottle radar reflection.

FIG. 4E shows the steps of the method 470 for identifying one or more objects and/or occupancy of objects, in accordance with embodiments. Method 470 is performed, in accordance with some embodiments, on the converted 3D images of step 420 of FIG. 4A. In some cases, method 470 may be operated on any received images of an area such as a retail environment area. Step 472 includes subtracting an initial image representing the leakage radiation between antenna elements in the plurality of electromagnetic antennas and a captured background radiation image of an empty area (e.g. an empty shelf in refrigerator or closet which doesn't include bottles or cans). Step 474 includes finding local peaks in the subtracted image, for example by taking the local derivative for each direction in each voxel in the subtracted image. For example, the radar image 402 of FIG. 4B is analyzed to extract eight local peaks 403 representing the eight bottles in the refrigerator. Step 436 includes filtering the identified local peaks by thresholding the intensity value interpolated from a pre-calculated table depending on the relative distance of the identified objects (e.g. bottles) from the radar system. Step 476 includes clustering the peaks into groups, for example, according to a known geometry of the identified objects (e.g. bottles) and identifying the number of objects in the area of the monitored environment. According to some embodiments, the clustering is operated according to one or more known clustering algorithms. In some cases, the clustering algorithm are adjusted assuming the object size is known. In some embodiments, the size (e.g. spatial dimension, for example, 3D dimension) is estimated by creating a 3D image of the identified one or more objects, and estimating the frequency of occurrence of the identified one or more objects, and averaging over all 3D images. Step 478 includes further classifying the formed clusters into, for example, lanes on the area (e.g. shelf) to identify which object is missing from each lane by comparing the number of objects in the current image to the previous image. For example, FIG. 4C shows two generated RF images 421 and 422 captured over time including RF reflections of respective coke cans 421' and 422' placed in a refrigerator shelve. In accordance with embodiments, the peaks in each captured RF image are clustered into groups to identify the number of cans at each image and accordingly at each refrigerator shelve over time. In the example shown in FIG. 4C the number of cans 421' identified at the generated image 421 is 42 while the number of cans identified in image 422 is 41. Further cluster analysis results in identifying that can 444 which was identified in image 421 (see circled cluster at the bottom right of the image) is missing in image 422 and therefore was for example bought by a customer.

FIG. 4F shows the steps of the method 480 for tracking movements such as customer movements and/or further identifying passersby customers and interested customers, in accordance with embodiments. Method 480 is performed, in accordance with some embodiments, on the converted 3D images of step 420 of FIG. 4A. In some cases, method 480 may be operated on any received images of an area such as a retail environment area. Step 482 includes averaging a number of constructed images (e.g. few generated 3D images for example 2,3,4,5-10 or 20 images) over time to filter out non-moving objects (e.g. inanimate objects). Step

484 includes filtering out the averaged images false targets (e.g. objects) identifications. In some cases, the false targets in the averaged images are caused, for example, by sidelobes of RF signals received from real targets or by other side effects. In some cases, the filtering step is performed using one or more known in the art methods such as sidelobe removal techniques (e.g. thresholding). Step 486 includes detecting real targets (e.g. non-false targets) by finding peaks in the 3D-image intensity, as illustrated for example in FIG. 4D. Step 488 includes clustering the peaks into a number of possible identified objects (e.g. customer IDs) using, for example, assumed typical radius of a person and past information about the direction of the clusters. In some embodiments, the peaks may be clustered using spatial windowing, direction including using data from previous images and calculating the spatial derivative w.r.t to time of each customer, radius is a constant parameter for all or some customers. In some embodiments, size estimation of the objects (e.g. customers) could be learned from the strength of the object's reflection. In some cases, only customers which are above a certain predefined height are considered to avoid counting children and/or pets and accordingly ignore their size. Step 490 includes tracking the identified customers location using a prediction filter which uses the customer's location and history (velocity, direction).

Step 492 includes classification of the identified customers into two defined groups: group 1: passersby customers, group 2 interested customers. In some cases, the classification is done by tracking which passerby stopped for a given time in a given location around the radar system or according to other predefined criteria.

Step 494 includes further classification of the identified interested customers of group 2 by detecting which of them opened a door of, for example, a cooler or cabinet in the area of the retail environment. In accordance with embodiments, a door, or a door opening detection such as a cabinet or refrigerator door is operated by placing a radar system such as system 100 or 300 above the door and/or in proximity to the door and creating one or more 3D images of the door and detecting the door opening based on measuring whether the measured reflection strength is above a certain threshold in the door's metal doorpost as it is being opened.

FIG. 5 is a flowchart 500 illustrating a method for monitoring one or more shelves in a retail environment, in accordance with embodiments. In some cases, the method includes monitoring one or more items in one or more shelves and/or customers in the retail environment, such as customers approaching and picking the items.

Some stages of method 500 may be carried out at least partially by at least one computer processor, e.g., by processing subsystem 308 and/or other computing unit. Respective computer program products may be provided, which comprise a computer-readable storage medium having computer-readable program embodied therewith and configured to carry out of the relevant stages of method 500. In other embodiments, the method includes different or additional steps than those described in conjunction with FIG. 5. Additionally, in various embodiments, steps of the method may be performed in different orders than the order described in conjunction with FIG. 5.

Step 510 comprises placing one or more radar systems in the retail environment. In some cases, the one or more radar systems may be attached to one or more shelves, in the retail environment. For example, as illustrated in FIG. 1 and FIG. 2 the radar systems may be attached to the bottom surface of the shelves.

Step 520 comprises transmitting one or more RF signals by one or more antennas of the antenna array of the radar systems towards one or more items on the shelve and/or one or more customers and step 530 comprises receiving at the antenna array one or more signals reflected by objects in the retail environment, such as the shelves and/or customers and/or items on the shelves.

Specifically, step 530 comprises receiving from the data acquisition subsystem 306 one or more signals reflected for example by one or more objects included in the environment (e.g. retail environment).

Step 540 comprises converting the one or more received RF signals into a set of responses. Specifically, the one or more received RF signals are converted (e.g. reconstructed) to one or more images, such as 3D (three-dimensional) images. In some embodiments, the one or more 3D images may be generated using one or signal processing techniques (e.g. radar imaging algorithm). Non limiting examples of such signal processing techniques include delay-and-sum beamforming, range migration algorithms and the like. The generated 3D images include one or more captured objects such as moving objects (e.g. customers) and/or inanimate objects such as bottles, cans and the like. For example, FIG. 4B shows a 3D image 402 (e.g. radar image) of bottles in a refrigerator captured by a radar system, such as system 300, in accordance with embodiments. Specifically, radar image 402 corresponds to image 404 including eight bottles 406 positioned in the back of the refrigerator.

Step 550 comprises analyzing the generated images to yield data. In some cases, the data comprises one or more of: occupancy of items on a shelf; and/or the type of said items; and/or movements of customers, for example near the respective shelve.

In accordance with embodiments, the generated 3D images may be analyzed to identify the number of objects in the area; and/or which object is missing or was bought by a customer based on an identification method 470.

In accordance with another embodiment, the generated 3D images may be analyzed to track and/or monitor one or more users (e.g. customers) moving in the area and optionally identify based on one or more movement tracking methods such as customer movement tracking method 480 passersby customers and interested customers.

Step 560 may optionally comprise, further analyzing the generated data of step 550 to yield additional data. In some cases, the additional data may include one or more measurements including, for example, the identified customer behavior; customer's height; customer's location (e.g. in front of the shelf or at any predefined or selected location), time spent in front of the shelf; items picked from the shelf; items returned to the shelf; direction of arrival and direction of departure; general and specific statics, such as behavior statistics, etc.

In some cases, the analysis to yield the additional data may be based on one or more detection methods such as identification method 470 and/or movement tracking method 480.

As mentioned herein above one of the challenges in identifying objects in a retail environment is associated with objects located at different distances and different view angles which generate different reflection strength. This challenge is overcome by maintaining calibration of a given sensor relative sensitivity over a range of angles and distances. Maintaining such a table overcomes another challenge, which is the variability between the different sensors calibration for different locations and view angles—for each object type we create a table which correlates it's reflection strength for each distance from the sensor, the creation of the table is done based on empirical measurements done for each object type.

Step 570 comprises comparing the measurements to one or more predefined thresholds.

Step 580 comprises generating an alert, for example when the quantity of a given item drops below the threshold.

Figure 6:
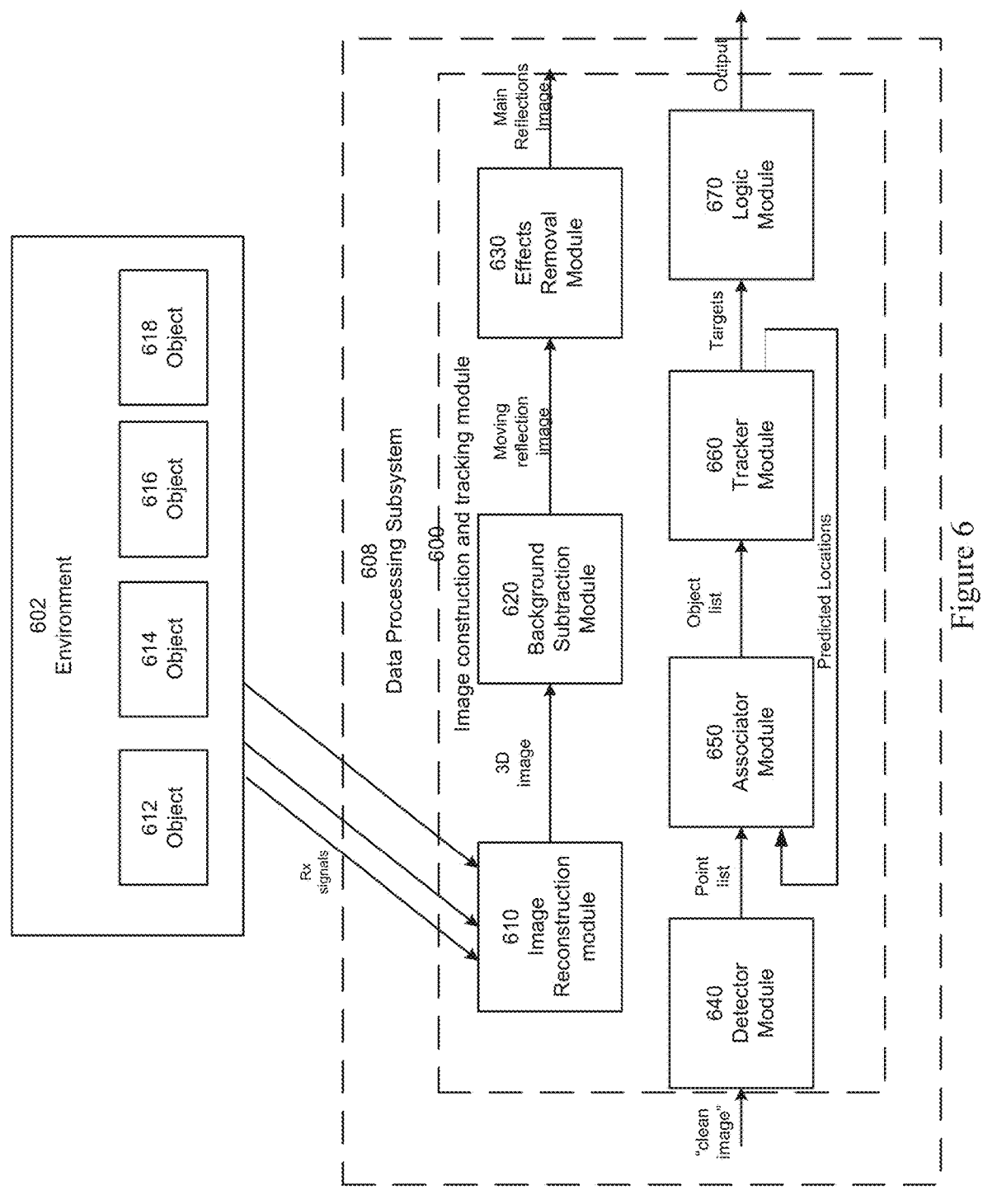
FIG. 6 is a block diagram of a radar imaging and object tracking module illustrating further details of the tracking method of FIG. 4E, in accordance with embodiments.

FIG. 6 is a block diagram of a radar imaging and object tracking module 600 illustrating further details of the tracking method 480 of FIG. 4E, in accordance with embodiments.

Some block modules of module 600 may be carried out at least partially by at least one computer processor, e.g., by processing subsystem 608 and/or other computing unit. Respective computer program products may be provided, which comprise a computer-readable storage medium having computer-readable program embodied therewith and configured to carry out of the relevant stages of module 600. In other embodiments, the method includes different or additional steps than those described in conjunction with FIG. 6. Additionally, in various embodiments, steps of the method may be performed in different orders than the order described in conjunction with FIG. 6.

In accordance with embodiments, the module 600 may comprise an image reconstruction module 610, a background subtraction module 620, sidelobe removal module 630, detector module 640, Associator Module 650, Tracker module 660 and Logic module 670.

The image reconstruction module 610 is configured and enabled to receive one or more Rx RF signal, captured for example by a radar system such as radar system 100, 200 or 300 and reflected from one or more objects 612 in an area in an environment 602 such as a retail environment. The image reconstruction module 610 is further configured and enabled to convert the one or more received RF signals and reconstruct one or more images, such as 3D (three dimensional) images including the related targets of the captured objects. Apodization (weighting) of space-frequency data may be used the reduce the sidelobe level.

The background subtraction module 620 is configured to receive the reconstructed 3D images and to subtract past 3D images representing the background to yield images of changes relative to the background state. Formation of background images may include averaging of several images. The subtraction may be performed coherently (complex-valued phasor based) or incoherently (magnitude-based).

The Artifact Removal module 630 is configured to receive the moving reflection images and remove unwanted effects such as sidelobes, multipath components, phantoms, shadows, or noise to yield Main reflections images (e.g. "clean images") which do not include any unwanted effects. An exemplary way to achieve this result is to detect the strong targets (using module 640) and to predict the potential location of artifact objects, based on the shape of the sidelobes and known reflective objects such as the back wall. At the suspected locations of artifact objects, the detection threshold is increased and the Detector Module 640 proceeds to detect weaker targets. Therefore, the Artifact Removal module 630 and the Detector Module 640 may operate jointly or in an iterative manner.

The Association module 650 is configured to group neighboring reflections into clusters, to yield representation of objects.

The tracker module 660 is configured to estimate trajectories of objects over time. The tracker module updates the locations of objects according to the reflections, expected object shapes and the rules describing the object dynamics. The association of reflections to objects may change over time as the estimated location of the objects changes. Therefore, the Association module 650 and Tracker module 660 operate jointly in an iterative manner.

The logic module 670 is configured to translate the information about objects and their trajectories into events, which are further reported to the system. Examples of events are displacement of an object, removal of an object, appearance of a new object, with size and location parameters. Other events may relate to humans moving in proximity to the sensor-detection of a person stopping in front of the shelf (with position and size), person leaving, and so on as described herein in respect to FIG. 4A, FIG. 4E and FIG. 4F.

In further embodiments, the processing unit may be a digital processing device including one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the system disclosed herein includes one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device.

In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media. In some embodiments, the system disclosed herein includes at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the system disclosed herein includes one or more databases, or use of the same. In view of the disclosure provided herein, those of skill in the art will recognize that many databases are suitable for storage and retrieval of information as described herein. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A radar system for monitoring an area in a retail environment, said area comprising one or more objects, the system comprising:

at least one antenna array comprising a plurality of electromagnetic antennas;

a transmitter subsystem for applying RF (radio-frequency) signals to said plurality of electromagnetic antennas;

a receiver for receiving RF signals from said plurality of electromagnetic antennas; and at least one processor, wherein the at least one processor is configured to:

convert the received RF signals into one or more images;

analyze the one or more images based on an object identification method or movement tracking method to generate data, said data comprises one or more of: number of said one or more objects in said area, the type of said objects; movements of said one or more objects in said area, wherein said object identification method comprises:

subtracting an initial image representing the leakage radiation between antenna elements in said plurality of electromagnetic antennas and a captured background radiation image of an empty area;

finding local peaks in the subtracted image; and clustering the peaks into groups according to a known geometry of the identified objects and identifying the number of objects in the area of the monitored environment.

2. The system of claim 1, wherein said one or more objects are one or more customers and wherein the at least one processor is configured to identify these one or more customers and the movement of these customers.

3. The system of claim 1, wherein the identification method further comprises:

filtering the identified local peaks by thresholding the intensity value interpolated from a pre-calculated table depending on the relative distance of the identified objects from the radar system.

4. The system of claim 1, wherein the identification method further comprises:

classifying the formed clusters into lanes on the area to identify which object of said one or more objects is missing from each lane by comparing the number of objects in the current image to previous image.

5. The system of claim 2, wherein the movement tracking method comprises:

averaging a number of generated images of the one or more images over time to filter out non-moving objects;

filtering out the averaged images false targets identifications;

detecting real targets by finding peaks in the image intensity;

clustering the peaks into a number of possible identified objects; and tracking the identified object's location using a prediction filter.

6. The system of claim 5, wherein the movement tracking method further comprises classifying the identified objects into two defined groups: passersby customers and interested customers.

7. The system of claim 1, wherein said area comprises one or more shelves holding one or more items and wherein the at least one processor is configured to estimate the occupancy of items on the shelf over time.

8. The system of claim 7, wherein the movement tracking method further comprises monitoring the items on the shelf being moved by the customer.

9. The system of claim 1, wherein said at least one antenna array is a MIMO (Multiple Input Multiple Output) antenna array.

10. The system of claim 1, further comprising at least two linear arrays of antennas, wherein at least two of said at least two linear arrays are orthogonal to each other.

11. The radar system of claim 1, further comprising at least four linear arrays of antennas, wherein at least two of said at least four linear arrays of antennas are orthogonal to each other and at least two of said at least four linear arrays of antennas are parallel to each other.

12. A method for monitoring an area in a retail environment, said area comprising one or more objects, the method comprising:

using at least one processor to:

receive one or more RF signals from a radar system, wherein said radar system comprises at least one antenna array comprising a plurality of electromagnetic antennas;

convert the one or more received RF signals into one or more images; and analyze the one or more images based on an object identification method or movement tracking method to generate data, said data comprises one or more of: number of said one or more objects in said area, the type of said objects, movements of said one or more objects in said area, wherein said object identification method comprises:

subtracting an initial image representing the leakage radiation between antenna elements and a captured background radiation image of an empty area;

finding local peaks in the subtracted image; and clustering the peaks into groups according to a known geometry of the identified objects and identifying the number of objects in the area of the environment.

13. The method of claim 12, wherein said objects are items on shelves and one or more customers in said area.

14. The method of claim 12, comprising further analyzing the generated data to yield one or more measurements of:

customer behavior; customer's height; customer's location; time spent in front of the shelf; items picked from the shelf; items returned to the shelf; direction of arrival and direction of departure; general and specific statics, such as behavior statistics.

15. The method of claim 14, comprising comparing the one or more measurements to one or more predefined thresholds.

16. The method of claim 15, comprising generating an alert when the quantity of a given item drops below a threshold.

17. The method of claim 12, wherein said object identification method comprises:

filtering the identified local peaks by thresholding the intensity value interpolated from a pre-calculated table depending on the relative distance of the identified objects from the radar system.

18. The method of claim 12, wherein the movement tracking method comprises:

averaging a number of generated images of the one or more images over time to filter out non-moving objects;

filtering out the averaged images false targets identifications;

detecting real targets by finding peaks in the image intensity;

clustering the peaks into a number of possible identified objects; and tracking the identified object's location using a prediction filter.

* * * * *